United States Patent
Iftime et al.

(10) Patent No.: US 9,985,308 B2
(45) Date of Patent: May 29, 2018

(54) CONTROLLED HYDROGEN PRODUCTION FROM HYDROLYSABLE HYDRIDE GELS

(71) Applicant: Palo Alto Research Center Incorporated, Palo Alto, CA (US)

(72) Inventors: Gabriel Iftime, Dublin, CA (US); Jessica Louis Baker Rivest, Palo Alto, CA (US); Sean R. Garner, San Francisco, CA (US); Martin J. Sheridan, Redwood City, CA (US); Saroj Kumar Sahu, Fremont, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 294 days.

(21) Appl. No.: 14/738,136

(22) Filed: Jun. 12, 2015

(65) Prior Publication Data
US 2016/0365589 A1    Dec. 15, 2016

(51) Int. Cl.
| | |
|---|---|
| *H01M 8/06* | (2016.01) |
| *C01B 3/06* | (2006.01) |
| *B01J 8/00* | (2006.01) |
| *H01M 8/065* | (2016.01) |
| *H01M 8/04291* | (2016.01) |
| *B01J 8/02* | (2006.01) |
| *B29C 35/02* | (2006.01) |
| *H01M 8/04119* | (2016.01) |
| *B29K 33/00* | (2006.01) |
| *B29K 67/00* | (2006.01) |
| *B29K 75/00* | (2006.01) |
| *B29L 31/34* | (2006.01) |

(52) U.S. Cl.
CPC ............... *H01M 8/065* (2013.01); *B01J 8/02* (2013.01); *B29C 35/02* (2013.01); *C01B 3/065* (2013.01); *H01M 8/04291* (2013.01); *B01J 2208/00814* (2013.01); *B01J 2208/00893* (2013.01); *B29K 2033/12* (2013.01); *B29K 2067/00* (2013.01); *B29K 2075/00* (2013.01); *B29L 2031/3468* (2013.01); *H01M 8/04164* (2013.01); *Y02E 60/362* (2013.01)

(58) Field of Classification Search
None
See application file for complete search history.

(56) References Cited

U.S. PATENT DOCUMENTS

| | | | | |
|---|---|---|---|---|
| 2002/0150803 | A1* | 10/2002 | Yang ................. | H01M 8/04029 429/421 |
| 2003/0091876 | A1* | 5/2003 | Rusta-Sellehy ......... | C01B 3/065 429/421 |

(Continued)

FOREIGN PATENT DOCUMENTS

EP    2228338    *    9/2010

*Primary Examiner* — Jonathan Crepeau
(74) *Attorney, Agent, or Firm* — Fay Sharpe LLP

(57) ABSTRACT

Today, energy requiring equipment commonly relies on batteries for power. The excessive weight and size of batteries severely limits their performance. Described herein is a lightweight portable energy system which includes an ultra-high capacity hydrolysable hydride gel cartridge for use in supplying hydrogen gas to hydrogen based energy generators. Hydrolysable hydride reactivity is controlled by tuning the amounts of hydrophilic and hydrophobic content in a polymer gel encapsulant of the cartridge.

18 Claims, 13 Drawing Sheets

(56) References Cited

U.S. PATENT DOCUMENTS

| | | | |
|---|---|---|---|
| 2005/0153176 A1* | 7/2005 | Forte | C01B 3/34 |
| | | | 429/420 |
| 2007/0194273 A1* | 8/2007 | Zhao | C01B 3/02 |
| | | | 252/182.12 |
| 2014/0178292 A1 | 6/2014 | Bennington et al. | |

* cited by examiner

CONTROLLED HYDROGEN PRODUCTION FROM HYDROLYSABLE HYDRIDE GELS

BACKGROUND

The present application is directed to energy production and, more particularly, to controlled hydrogen production.

Energy requiring equipment, including portable equipment, such as unmanned aerial vehicles (UAVs), communication devices, geo-positioning devices, sensors, and observation devices, among many others, rely on batteries or fossil fuels for power. In general, batteries are presently preferred over fossil fuels because they have zero emissions, are silent and they generally diminish the risk of explosion. Unfortunately, state of the art battery technology (such as Li-ion) has a much lower energy density when compared to fossil fuels. For example, the energy content of a 1 kg of Li-ion battery is only 0.15 kWh, which is ~70 times lower than the energy content of 1 kg of gasoline. The weight and size of batteries also limits the usefulness.

Hydrogen gas can be used as a fuel without producing harmful emissions, and is theoretically the most energy dense and efficient fuel source (33 kWh/Kg). However, compressed hydrogen presents significant volumetric disadvantages, as well as safety and packaging challenges for implementation as a power source.

Another form of hydrogen fuel is that produced by the use of hydrides. In a first approach, chemical hydrides produce hydrogen gas by a chemical decomposition reaction which is thermally activated. Systems incorporating hydrides such as ammonia borane have been recently reported, such as in U.S. Patent Publication No. 20140178292 (Stephen Bennington et. al.). However these systems are disadvantaged because of the need to provide heat to activate the hydrogen production. It is very difficult to release all the hydrogen stored by this material. Particularly the release of the last molecule of hydrogen requires very high temperatures, above 400° C. (Celsius). The system design is further disadvantaged by the need to provide additional heater units which increases the system complexity. There is also a safety concern with the ammonia borane, as it releases hydrogen gas slowly even at low temperatures below 80° C., posing an explosion and fire risk to the user.

In a second approach, hydrogen gas is produced by the reaction of metal hydrides with water. The hydrogen generation capability of metal hydrides when reacting with water is outstanding. This system is beneficial when compared with the chemical hydride method because half of the hydrogen gas results from the metal hydride, while the other half comes from water that is reacted with the hydride. Water is generally easily available and is inexpensive when compared with metal hydrides. However, simply adding water to metal hydrides would be unsafe since their extreme reactivity with water could result in explosion and fire. Therefore they are not directly usable as a hydrogen release material. They are also unsafe to handle due to humidity sensitivity and other issues. One successful approach to stabilized metal hydride systems has been demonstrated with a sodium borohydide system. The stabilized system is provided as solution of sodium borohydride of a concentration of up to about 20% dissolved in water and stabilized by about 3% sodium hydroxide. Sodium borohydride does not react with water in the basic pH enabled by the hydroxide. The system generates hydrogen when activated by a catalyst. Unfortunately, hydride implementations have been very low in storage density, falling in the range of a few percent by weight at best, particularly because of the fact that the vast majority of the overall fuel weight is water. This large water requirement, along with other necessary equipment, increases the weight of the system and, again, is one of the reasons the energy density of a sodium borohydride system is low.

There is a need for a lightweight and safe fuel that may be used with energy requiring equipment including, but not limited to, portable type equipment.

BRIEF DESCRIPTION

Today, energy requiring equipment commonly rely on batteries for power. The excessive weight and size of batteries severely limits their performance. Described herein is a lightweight portable energy system which includes an ultra-high capacity hydrolysable hydride gel cartridge for use in supplying hydrogen gas to hydrogen based energy generators. The flow of produced hydrogen gas is achieved by controlling the hydrolysable hydride reactivity with water by tuning the amounts of hydrophilic and hydrophobic content in a polymer gel encapsulant of the cartridge. Unlike prior art aqueous sodium borohydride system, the present embodiments use just the required or slightly higher amount of water required for complete hydrolysis.

DETAILED DESCRIPTION

Existing energy requiring equipment, particularly such portable equipment, relies on batteries and other fuel for power. Among other drawbacks, the excessive weight and size of batteries severely limits their performance. Other fuels include their own drawbacks, such as gasoline having high flammability and explosion issues.

The present application therefore discloses a lightweight hydrolysable hydride based fuel generation system designed to supply hydrogen to hydrogen energy generators such as, but not limited to, fuel cells and hydrogen based internal combustion engines, which in turn supplies power to the mentioned equipment.

The hydrolysable hydride reactivity in the hydrogen production system is controlled by using hydrophilic and hydrophobic content, which has been tuned within a polymer gel (e.g., cured) encapsulant. As used herein, tuned is intended to mean the ratios of the hydrophilic and hydrophobic materials are included in certain amounts depending on the particular implementation.

The systems and methods of the present application incorporate the use of a hydrolysable hydride gel material, combined with water and/or water vapor to produce hydrogen gas which is used in conjunction with hydrogen compatible systems to produce electric power. In one embodiment, the hydrolysable hydride gel consists of hydrolysable hydride particles dispersed in a suspension material. The hydrolysable hydride particles may, but are not limited to, metal hydride and/or metal borohydride particles, and the suspension material may be, but is not limited to, a polymer material. The hydrolysable hydride gel is incorporated into a system which produces a controlled flow of hydrogen in reaction to the addition of water and/or water vapor.

Figure 1A:
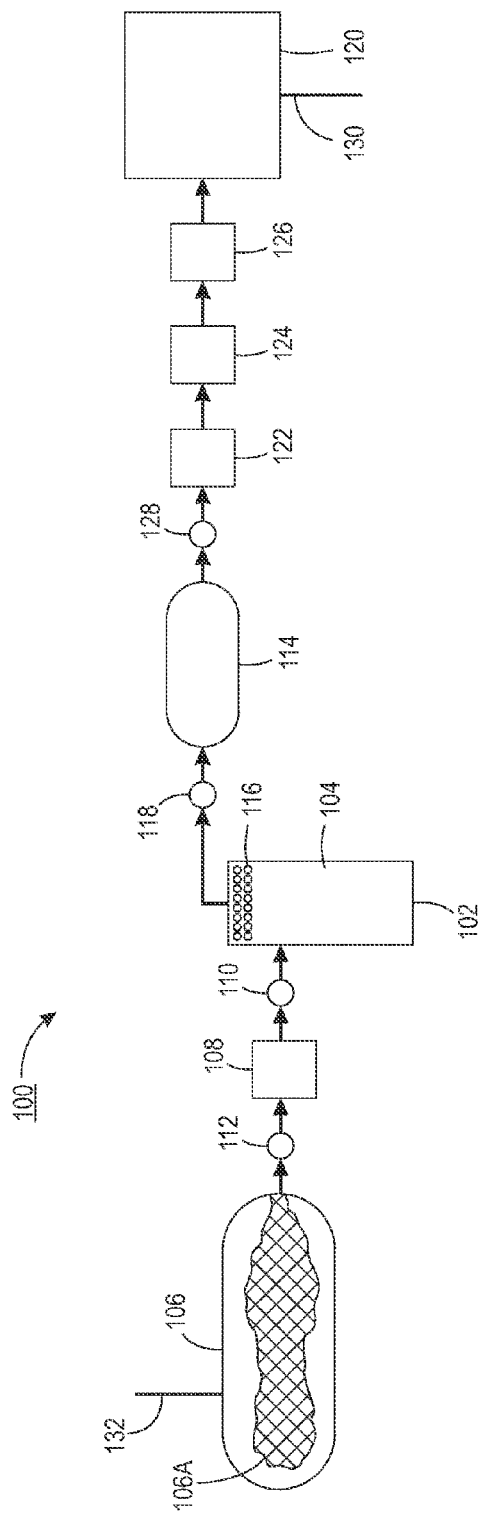
FIG. 1A illustrates a fully integrated power system incorporating a hydrogen production system according to the present concepts.
Figure 1B:
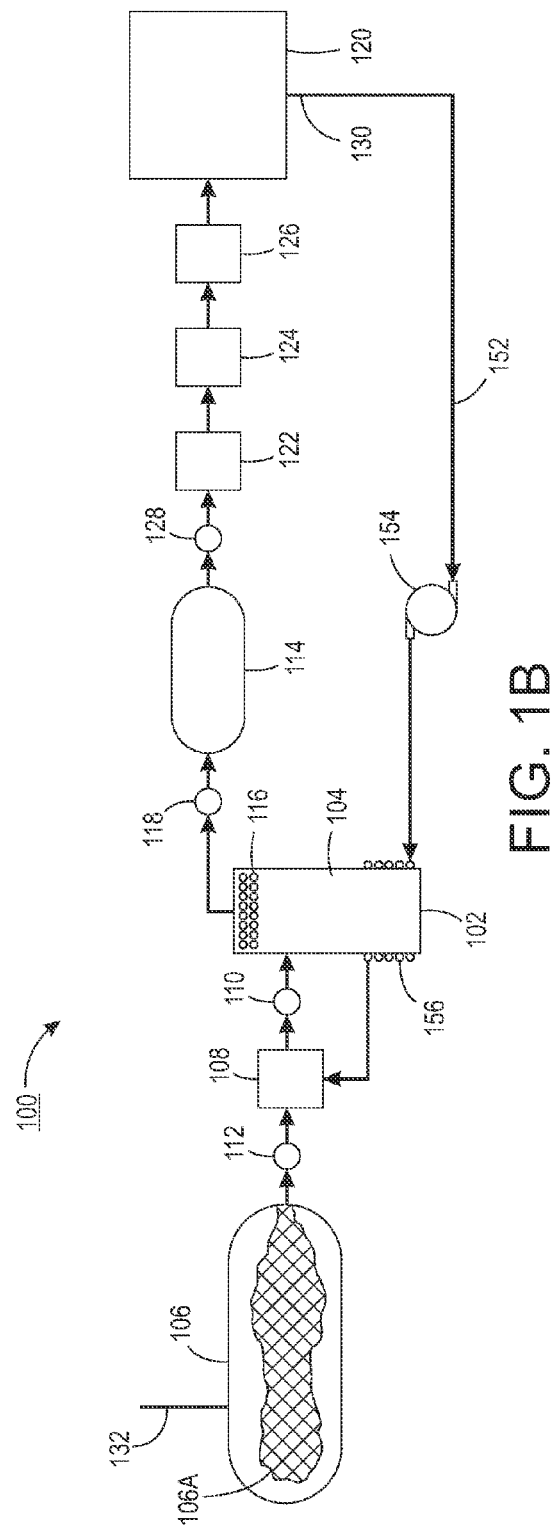
FIG. 1B illustrates a fully integrated power system incorporating a hydrogen production system and fuel cell according to the present concepts.

Turning to FIGS. 1A and 1B, illustrated are variations of integrated power systems 100, 150 according to the present application. With attention to FIG. 1A, illustrated is system 100 consisting of a hydrogen production unit (or hydrolyzer) 102 into which a hydrolysable hydride gel cartridge 104 is loaded. The hydrogen production unit 102 includes an inlet port 102*a* which provides water (liquid or vapor phase) from a hydraulic accumulator 106 metered in by controlled gravimetric or volumetric flow or allowed in through pressure gradients, via a flow control valve 110, and water check valve 112, sensed by a water pressure sensor 112. Inside the hydrogen production unit 102, the hydrolysable hydride gel material reacts with the water to produce hydrogen gas. The hydrogen gas exits the hydrogen production unit 102 to a hydrogen buffer or accumulation tank 114 through a moisture-controlling membrane 116 and hydrogen check valve 118. From the hydrogen buffer or accumulation tank 114, the hydrogen gas is controllably supplied to a fuel cell 120 via hydrogen control valve 122, hydrogen pressure regulator 124, and hydrogen flow controller 126, sensed by hydrogen pressure sensor 128. The pressure and flow of the hydrogen gas is therefore input to the fuel cell 120 by a control loop which controls the rate of water is added to the hydrogen production unit (hydrolyzer) 102.

FIG. 1A further illustrates a water (water vapor) output 130 which acts as an outlet for water produced by operation of the fuel cell 120, as well as a hydraulic accumulator gas inlet 132. It is noted the hydraulic accumulator 106 is designed to store water (water vapor) in a bladder 106*a*. This configuration is designed such that at startup, a volume of water is added to the bladder 106*a* with substantially no gas back pressure. The gas side of the hydraulic accumulator 106 is then pressurized from an external gas pressure source (not shown). During normal operation, the water pressure will be higher than the pressure being generated in the hydrogen production unit 102. In one embodiment the pressure is measured at the hydraulic accumulator outlet by the water pressure sensor 112, to ensure proper pressure balance. It is to be appreciated that while the hydraulic accumulator 106 is shown as a pressurized bladder arrangement, other configurations for a water supply are considered such as including but not being limited to a water reservoir which uses a pump or gravity to provide the supply of water.

Turning to FIG. 1B depicted is another integrated power system 150 embodiment, which has similarities to FIG. 1A, but also includes a water recycling system configured to recycle water (water vapor) from the fuel cell, and a cooling system to use water (water vapor) to cool the hydrogen production unit (hydrolyzer).

With continuing attention to FIG. 1B the water produced by fuel cell 120 from the fuel cell operation is captured from outlet 130 and provided to a feedback or recycle line 152. This feedback or recycle line 152 transports the water (water vapor) to a pump 154, which in turn moves the water through a return water heat exchanger 156, which is in operational and/or physical contact with the production unit (hydrolyzer) 102. In one embodiment the heat exchanger 156 in a series of connected tubes on the outside surface of the production unit (hydrolyzer) 102. The water from the fuel cell 120 is commonly at a cooler temperature than the heat generated by the production unit (hydrolyzer) 102. By moving the water (water vapor) through the heat exchanger 156, the temperature of the production unit (hydrolyzer) 102 can be lowered. It is to be appreciated the heat exchanger shown in the present embodiment is just one example, and other heat exchanger configuration may also be employed.

With continuing attention to FIG. 1B, water from the heat exchanger 156 is then provided to an additional portion of the recycling or feedback line 152 and directed to hydrogen production unit (hydrolyzer) 106 through water flow control valve 108. It is to be appreciated in an alternative embodiment the recycle of feedback line 152 will go directly to the flow control valve 108, and the heat exchanger will not be implemented, or if implemented it will not use the recycled water (water vapor). Still further instead of being directed to the water flow control valve 108, the recycled water (water vapor) maybe stored in the hydraulic accumulator until 106 until it is ready for injection into the hydrogen production unit 102.

Figure 2:
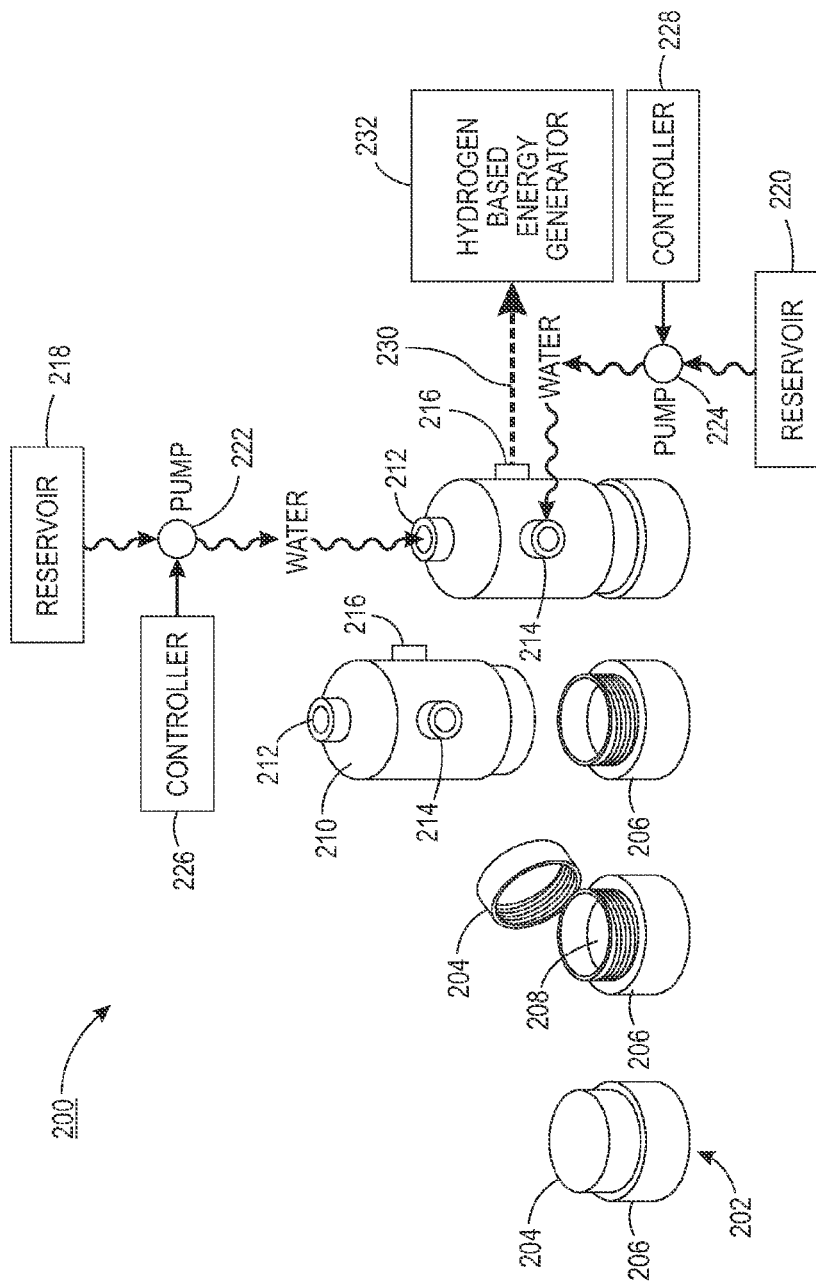
FIG. 2 is an embodiment of the hydrogen production system in accordance with the concepts of the present application.

Turning to FIG. 2, illustrated is an embodiment of a hydrolysable hydride gel-based system 200 according to the teachings of the present application. Initially, in FIG. 2, depicted is a disposable hydrolysable hydride cartridge 202 shown in various stages. Cartridge 202 includes a cap or top portion 204 and a cartridge body or base 206. Cartridge 202 is configured to have cap 204 removable from cartridge base 206 when the cartridge base 206 is to be used. Otherwise, the cap 204 is attached and maintained to provide storage integrity for the hydrolysable hydride gel 208 found within the cartridge base 206. Further discussion regarding the hydrolysable hydride gel will be set forth below.

In operation the cartridge base 206 is attached to a hydrolyzer unit 210. In this embodiment the hydrolyzer and base are shown having a threaded male/female arrangement for secure attachment. However, it is to be understood any other known manner for secure engagement such as, but not limited to, clamps, snaps, etc. that hold components 206 and 210 together would be appropriate. It is to be appreciated that in the embodiment of FIG. 2, the cartridge 202 may be considered disposable as the cartridge base 206 may be removed from the hydrolyzer 210 and other cartridges may then be attached. This however is not to foreclose the teaching of the hydrolyzer and cartridge base 206 formed as a single unit.

With continuing attention to the hydrolyzer 210, input ports 212, 214 and output port 216 are provided. It is to be appreciated that while two input ports have been shown, and a single output port has been shown, this is not intended to be limiting, and a hydrolyzer may have additional inputs and/or outputs as appropriate for a particular implementation.

With continuing attention to FIG. 2, the combined cartridge body 206 and hydrolyzer 210 are placed within a system wherein water from reservoirs 218, 220 is pumped by pumps 222, 224 under the control controllers 226, 228 to provide controlled water flow into the interior of hydrolyzer 210 through input ports 212, 214. Supply of water initiates a chemical reaction between the water and the hydrolysable hydride gel 208, which generates a hydrogen gas 230 output via output port 216, and which is received by a hydrogen based energy generator 232 which uses the hydrogen to operate. It is to be understood that when the word "water" is used herein it also intended to include "water vapor."

It is noted the hydrogen based energy generator 232 may be one of any of a number of more particular systems, such as hydrogen based fuel cells, hydrogen internal combustion engines, among others.

Figure 3:
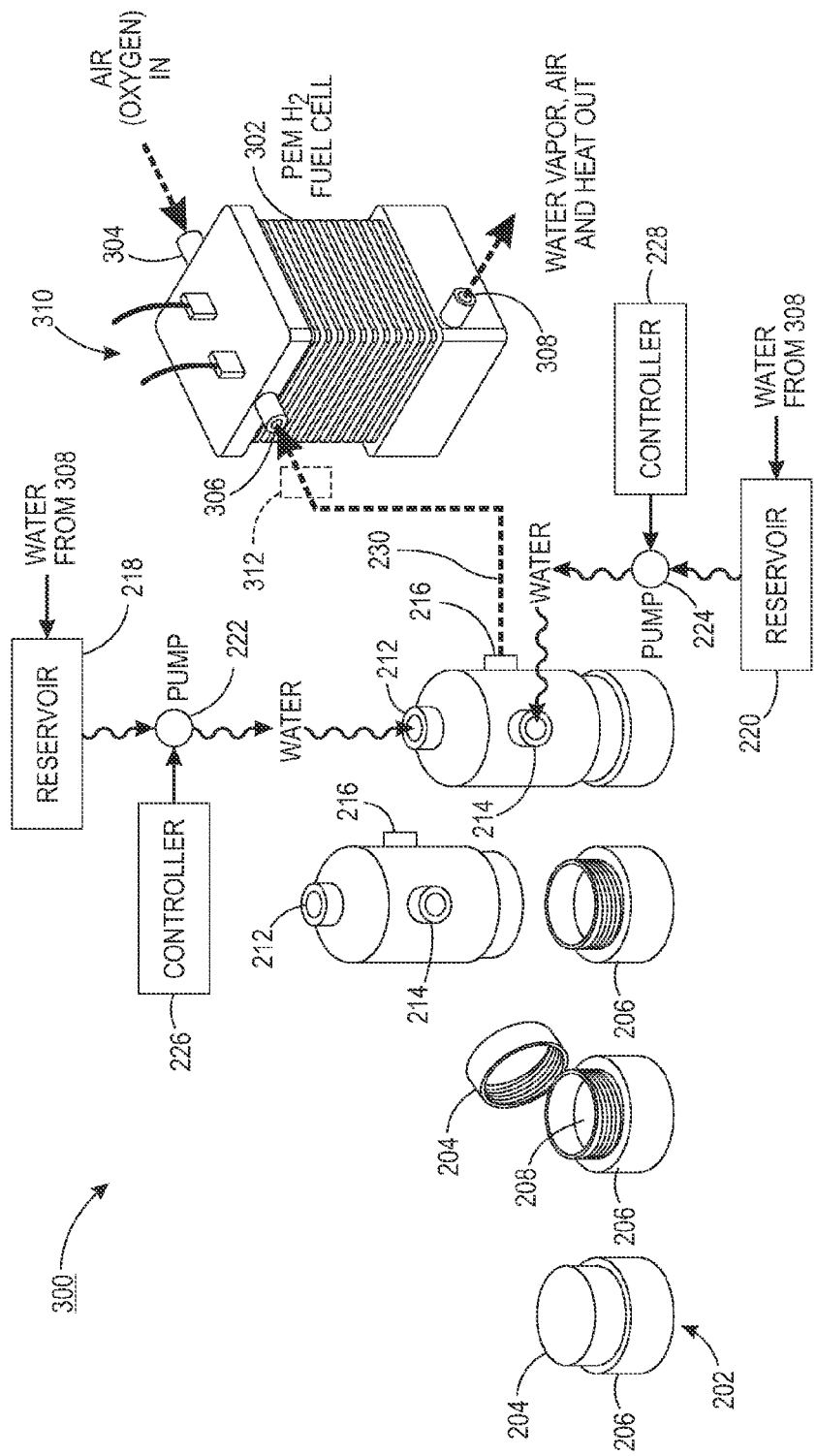
FIG. 3 illustrates a further embodiment of the present concepts of the hydrogen production system feeding a fuel cell.

Turning to FIG. 3, illustrated is a more specific system 300, which includes the hydrogen based energy generator 232 of FIG. 2 implemented as a hydrogen fuel cell (e.g., PEM-H2) 302. In this embodiment, fuel cell 302 includes an input port 304 to receive air or oxygen, and a second input port 306 to receive the hydrogen gas 230 produced by the previously discussed process. Fuel cell 302 also includes an output port 308 for water vapor, air and heat. The electrical energy generated by the fuel cell 302 in the form of DC power, is output via DC output terminals 310.

In an alternative embodiment of FIG. 3, depending on fuel cell specifications, dry hydrogen may be required for operation of the fuel cell. In this situation a hydrogen permeable membrane (but with water vapor blocking properties) 312 can optionally be placed in the hydrogen gas path before reaching the fuel cell 302.

It is to be appreciated the controllers of FIGS. 2 and 3 may be any of a number of control systems, including industrial controllers, computer based control systems, among others. The controllers 226, 228 act to determine the rate at which water is moved from reservoirs 218, 220 by pump 220, 222 for delivery to the hydrolyzer inputs (212, 214) previously discussed. It is to be understood that while the reservoirs, pumps and controllers are shown as separate systems, they may be integrated into a single system or have a plurality of the individual elements provided in various combinations or individually.

The combined cartridge base 206 and hydrolyzer 210 configurations of FIGS. 2 and 3 are understood to represent both stationary and mobile embodiments. For example, in a stationary embodiment, at least one of the reservoir(s) 218, 220, pump(s) 222, 224 and controller(s) 226, 228 is/are located externally (i.e., not integrated with the combined cartridge base 206 and hydrolyzer 210 arrangement, whereas in a mobile embodiment at least one of the water reservoir(s) 218, 220 is/are integrated with the combined cartridge base 206 and hydrolyzer 210 arrangement, along with any required valves, pumps and/or controllers which would be needed as known in the art.

Figure 4A:
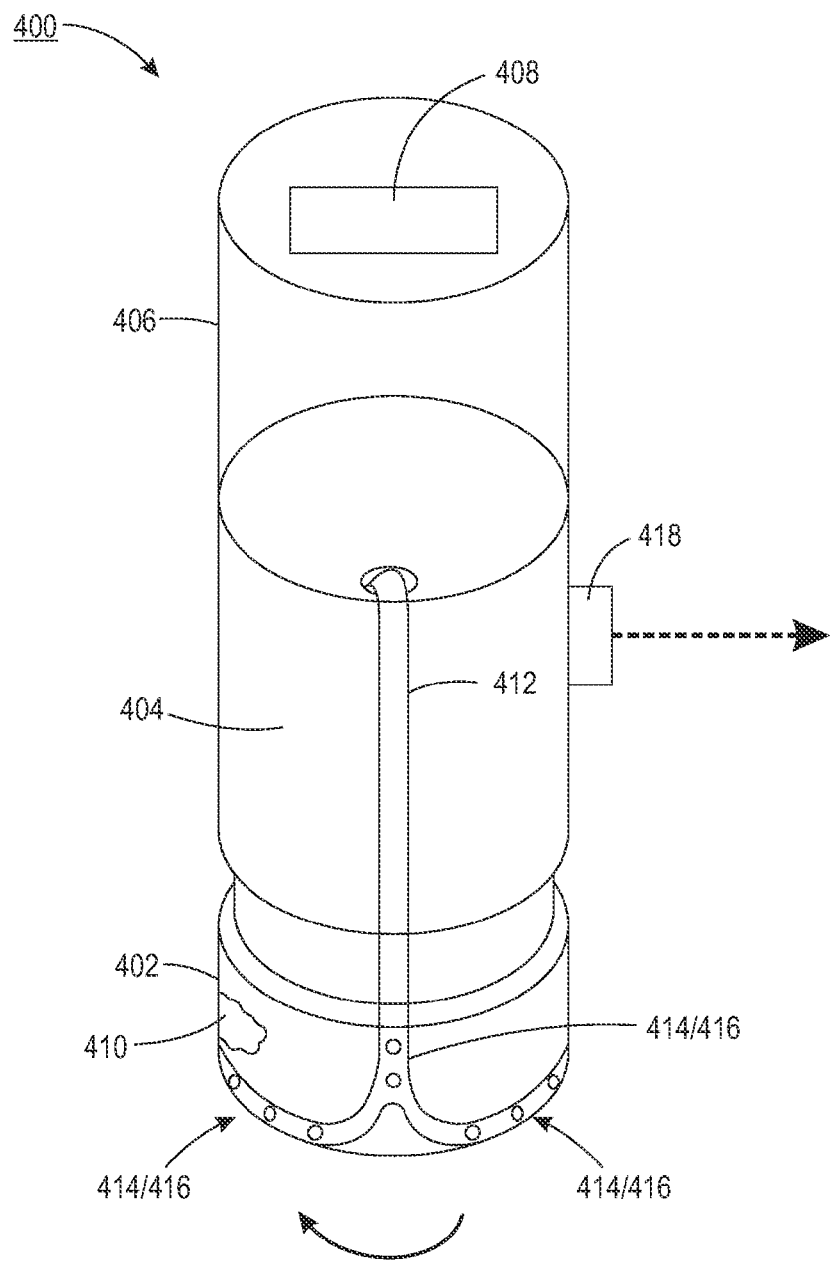
FIGS. 4A, 4B and 4C illustrate front and side and break out views of a mobile embodiment of the present concepts.
Figure 4B:
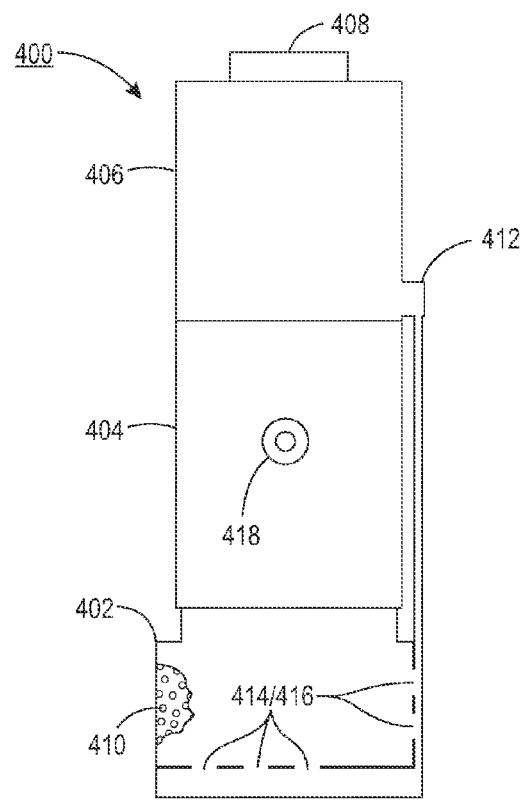
Figure 4C:
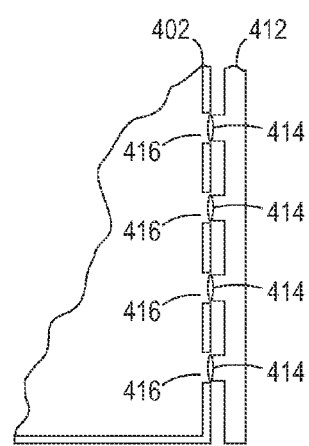

A more particular example of a mobile embodiment is illustrated by arrangement 400 of FIGS. 4A, 4B and 4C. With attention to FIGS. 4A and 4B, shown is a cartridge base 402 in combination with a hydrolyzer 404, and an integrated water reservoir or supply 406 located in this example on top of the hydrolyzer 404. The hydrolyzer 404 and water reservoir or supply 406 are provided in a secured attached relationship which may be accomplished by forming the parts as a single permanent unit or having the parts built to include a detachable configuration (e.g., snap fit, screw on connection or other known arrangement).

Also shown in FIGS. 4A and 4B is an integrated control arrangement 408, which is understood to include any valve, pump, and controller components and arrangements that may be needed to move and/or control the movement of the water. In this embodiment the cartridge base 402 includes a hydrolysable hydride gel 410 (shown in cut away) similar to that discussed in connection with FIGS. 2 and 3. The water reservoir or supply 406 is shown connected to a water transportation tube 412 which provides water from the water reservoir or supply 406 down along a side of the hydrolyzer unit 404 to the cartridge base 402. In this embodiment, and as shown more clearly in FIG. 4C, both the cartridge base 402 and the tube 412 have openings 414, 416 which are aligned with each other to permit the water from the tube 412 to pass into the interior of the base cartridge 402. Entry of the water initiates reactions between the water and the hydrolysable hydride gel 410 in a controlled fashion. In this embodiment the openings 416 are moved into openings 414 to reduce possible water leakage.

As also seen in this embodiment (particularly FIGS. 4A and 4B), the openings 414, 416 are found both in the horizontal and vertical direction of the cartridge base 402, which allows the water to enter the cartridge base 402 along the sides and up from the bottom of the cartridge base 402. It is to be appreciated that the openings might be located in other positions other than that shown. Further, the openings may be sized differently from each other as a way to provide the desired flow into the cartridge base 402. For example, the opening pairs 414 and 416 located in the tube 412 near the bottom (in the horizontal position) of the cartridge base 402 are in one embodiment made smaller than the opening pairs 414, 416 that are in the vertical portion of the tube 412. In other words the sizing and placement of the openings are to be tuned to produce the desired flow into the cartridge base 402 for a particular implementation. FIGS. 4A, 4B, and 4C are directed to one embodiment and it is understood mobile embodiments may include variations.

As a non-limiting example, a water transportation tube used for the movement of water, such as the tube 412 of FIGS. 4A, 4B, and 4C, may be located within the interior of the cartridge base 402 and/or hydrolyzer 404. Additionally, the arrangement of FIGS. 4A, 4B, and 4C include the use of gravity to either fully or at least partially provide water flow. Water flow however can also be provided and/or controlled by implementation of the pump(s), valves(s), controller(s) such as described in FIGS. 2 and 3, and which are integrated as part of a mobile embodiment.

It is noted that in FIGS. 4A and 4B a hydrogen fuel output 418 is depicted. This allows the generated hydrogen gas to be passed to hydrogen fuel based generators or other devices such as previously discussed in connection with FIGS. 2 and 3. While the foregoing discussion and figures have shown the water inputs and the fuel output at particular locations, it is understood these inputs and outputs will be positioned at particular locations and in particular numbers that are most appropriate for a particular implementation, and the forgoing is not intended to be limiting in any manner.

Figure 5A:
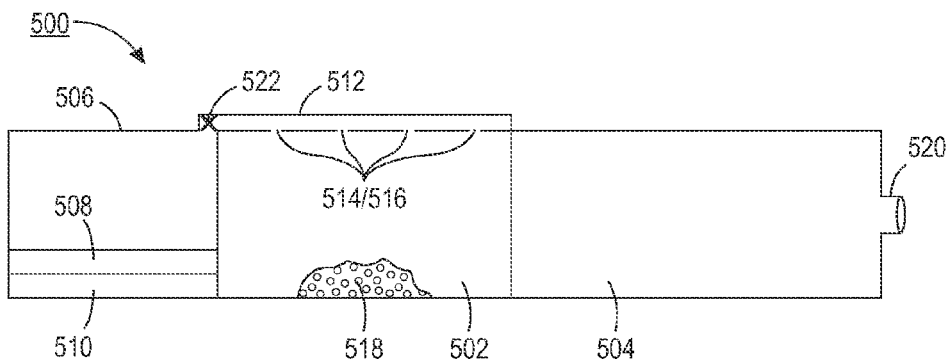
FIGS. 5A and 5B illustrate horizontal implementations of mobile embodiments of the present concepts.

With initial attention to FIG. 5A, horizontal hydrogen production system 500 is configured to include a cartridge base 502 which may be disposable or non-disposable in relationship to hydrolyzer 504. A water reservoir or supply 506 is shown in an attached disposable or non-disposable relationship to the cartridge base 502. Also included are an integrated pump 508 and a controller 510. Water from water reservoir or supply 506 is pumped to a water transportation tube 512. As arranged in this embodiment, the tube 512 includes openings 514 which match openings in the cartridge base 516 (in a manner similar to that discussed in connection with FIG. 4C above). Water is pumped through tube 512 and it is dispersed into the interior of the cartridge base 502 such that the water begins reactions with a hydrolysable hydride gel 518 (in cut away) as discussed in the previous embodiments. Hydrogen gas is formed in hydrolyzer 504 and is output in an appropriate manner via output 520. A valve 522 is provided to control flow to tube 512.

This horizontal configuration is useful in connection with machines that are stationary as well as mobile or portable. However, it finds particular usefulness with portable machines, such as drones or other moving vehicles as its design provides a low profile.

Figure 5B:
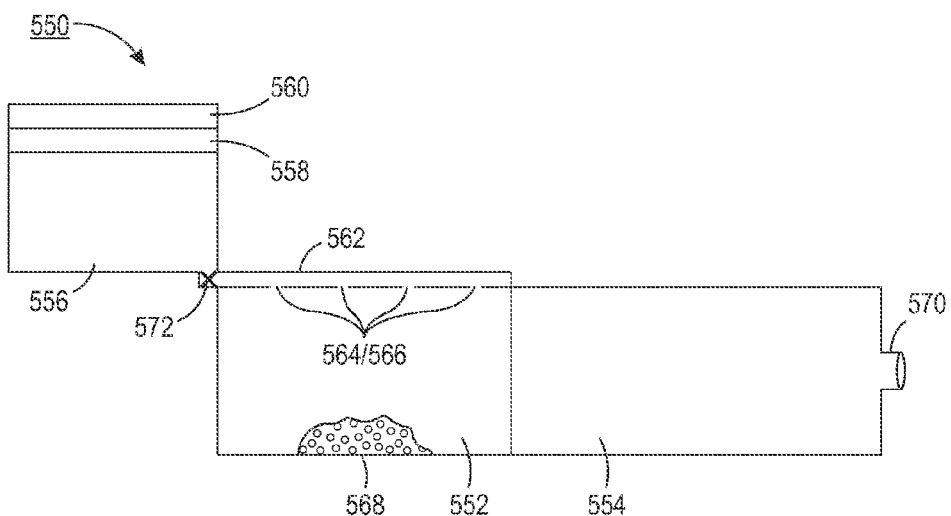

Turning to FIG. 5B, illustrated is an alternative embodiment of a horizontal hydrogen fuel generation system 550. In this embodiment, there are similarly configured horizontal profiled cartridge base 552 and hydrolyzer 554. However in this embodiment, water reservoir or supply 556 is located above the cartridge base 552 and hydrolyzer 554. This allows for gravity to affect movement of the water. However, alternatively it is also shown that a pump 558 and a controller 560 may be provided to assist in water movement. Similar to the previous figure, a water transportation tube 562 is connected to the water reservoir or supply 556. The tube includes openings 564 which correspond to openings 566 of the cartridge base 552. As water moves into the cartridge base 552, it causes reactions with the hydrolysable hydride gel 568. A hydrogen fuel output 570 permits for the flow of hydrogen fuel generated in hydrolyzer 554 to be moved out of the mobile system. System 550 also is shown to include a valve 572 which controls the water flow to tube 562. It is to be also understood that such a valve arrangement may be included in FIG. 5A, and additional valves may be provided with openings 514, 516 and 564, 566 to control the water flow.

Additionally as discussed with previous embodiments, it is noted that the foregoing embodiments may be altered in various manners and still stay within the intent of the embodiments. In a non-limiting example, tubes 512, 562 are implemented internal to the cartridge base 502, 552 of the systems.

Figure 6:
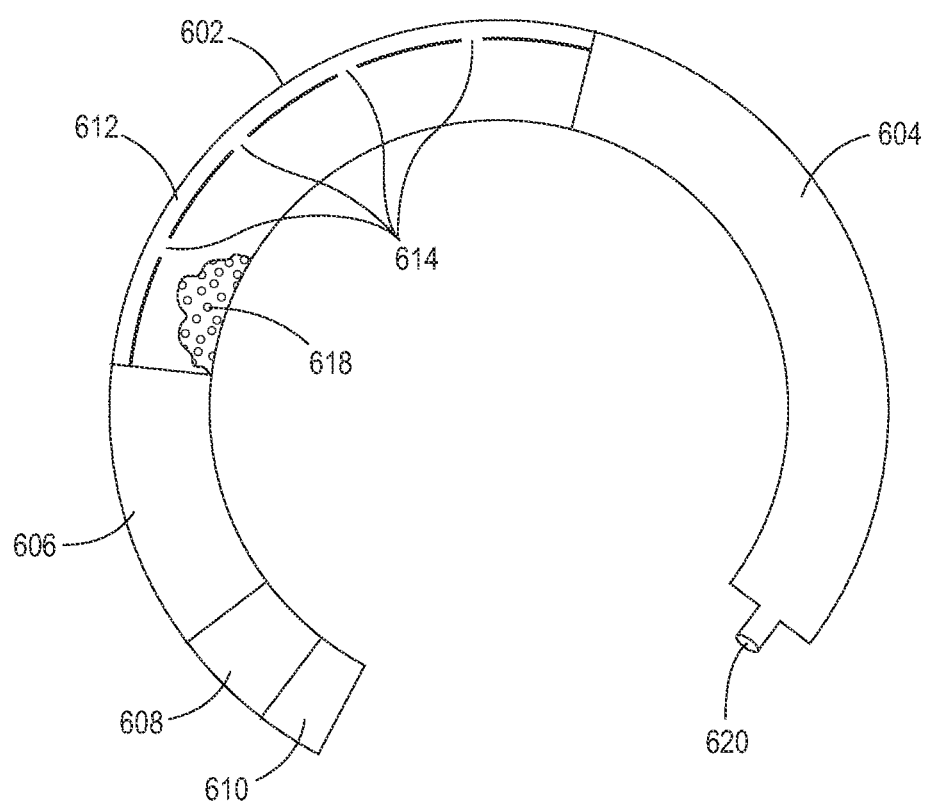
FIG. 6 illustrates a contoured version of a mobile embodiment of the present concepts.

Turning to FIG. 6, illustrated is another embodiment of a hydrogen generation system 600 according to the teachings of the present application. Herein, the system is again presented in a horizontal profile, such as discussed in connection with FIGS. 5A and 5B. However instead of being substantially straight, this embodiment shows the present system may be developed in a contoured shape, such as to wrap around a device or even a human being (i.e. such as in the form of a belt structure). In this embodiment, therefore the cartridge base 602 and hydrolyzer 604 are presented in an arced form where, for example, a water reservoir or supply 606 is attached to the cartridge base 602 and a pump 608 and a controller 610 are optionally provided in certain embodiments. Water from water reservoir or supply 606 is provided to the cartridge base 602 via a water transportation tube 612 (formed internal to cartridge base 602). As similarly discussed in previous embodiments, the transportation tube includes openings 614 (however no matching openings in the cartridge base 602 are needed since the tube 612 is internal). As the water enters the interior of cartridge base 602, it interacts with the hydrolysable hydride gel 618. These reactions result in hydrogen gas being formed in the hydrolyzer 604. The hydrogen gas that is generated may be output via output 620. As stated with the previous embodiments, variations to this particular embodiment may be made in accordance with one of ordinary skill of the art.

In accordance with the systems illustrated in the foregoing, what has been shown in general is a hydrolysable hydride gel contained in a lightweight disposable or non-disposable cartridge that is connected to a hydrolyzer unit. When exposed to water, the hydrolysable hydride gel creates a reaction that generates hydrogen gas which is then fed to a hydrogen based energy generator (for example, a fuel cell or internal combustion engine) to generate power. Particular components described in the figures include the hydrolysable hydride gel that is composed of hydrolysable hydride materials (particles, as well as tablets, etc.) which are carried in a hydrolysable hydride gel cartridge, a hydrolyzer unit and the accompanying controls for that unit, as well as a hydrogen based energy generator which consumes the generated hydrogen gas.

It is to also be understood that each of the embodiments of FIGS. 3, 4A, 4B, 4C, 5A, 5B, and 6, as well as variations of these embodiments will implement recycling feedback and cooling loops as discussed in connection with at least FIG. 1B.

(a) Hydrolysable Hydride Gel

The hydrolysable hydride gel consists of hydrolysable hydride particles dispersed into a suspension matrix, such as, but not limited to, a polymer matrix.

It is understood that as used herein "particles" will include any form that the hydrolysable hydride material may be found, including but not limited to, powders, tablets, etc.

(a.1.) Metal Hydride

Figure 7:
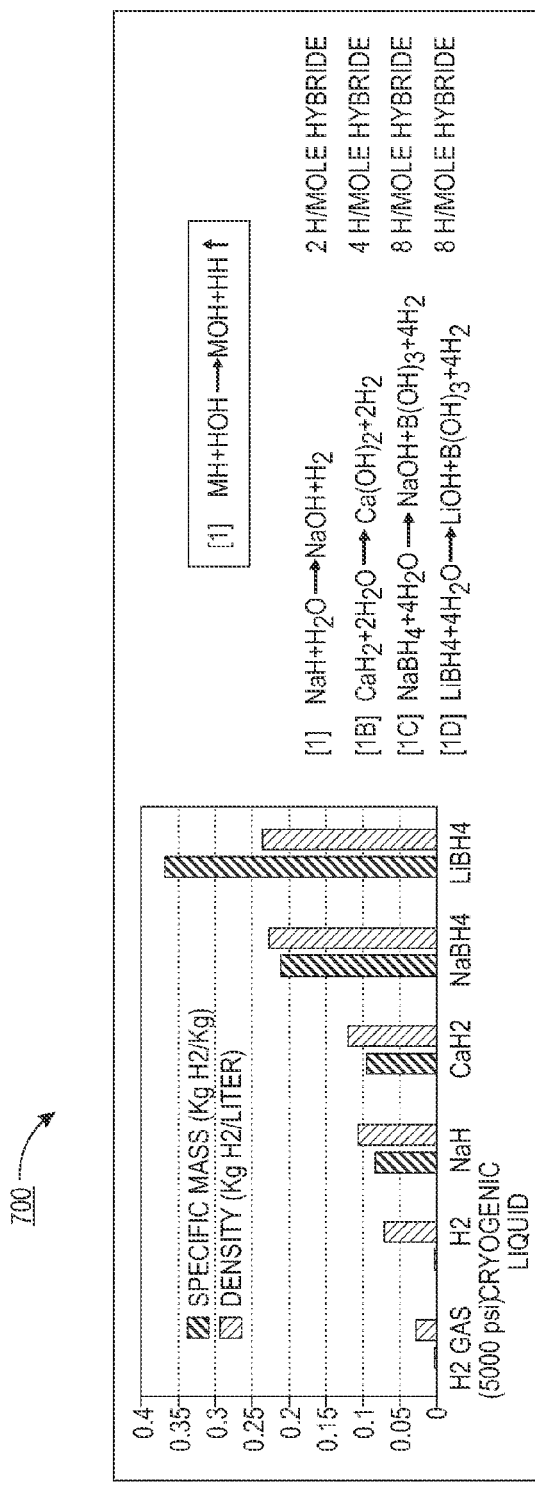
FIG. 7 is a chart illustrating the energy density characteristics of a variety of hydrogen fuels.

Included as a particular type of hydrolysable hydride are metal hydrides. The hydrogen generation capability of metal hydrides when reacting with water is outstanding. Half of the hydrogen gas results from the metal hydride, while the other half comes from water that is reacted with the hydride. For example, 1 kg of lithium borohydride (LiBH4) produces 0.37 kg of hydrogen—about 15× higher density than possible with high-pressure hydrogen tanks of the same volume. Other hydride candidates include, but are not limited to calcium hydride (CaH2), sodium hydride (NaH), and sodium borohydride (NaBH4), characteristics of which are shown in Table 700 of FIG. 7, which depicts hydrogen gas generation efficiency of various metal hydrides, compared with compressed hydrogen gas. More generally hydrolysable hydrides may also be understood to include standard or conventional metal hydrides and metal borohydrides. Some particular suitable conventional metal hydrides include lithium hydride, sodium hydride, potassium hydride, beryllium hydride, magnesium hydride, calcium hydride, lithium aluminium hydride, sodium aluminium hydride.

Particular metal borohydrides include: lithium borohydride, sodium borohydride, potassium borohydride, magnesium borohydride, beryllium borohydride, calcium borohydride, aluminum borohydride, titanium borohydride, zinc borohydride, manganese borohydride, ammonium borohydride, lithium borohydride ammoniate, lithium borohydride diammoniate, magnesium borohydride di-ammoniate, magnesium borohydride hexa-ammoniate.

A particular parameter to control the hydrogen flow produced by the reaction in the present application is the hydrolysable hydride particle size and shape. Change in size and shape allow tuning of the hydride positive surface area to volume ratio, and therefore the reactivity of the particles.

When reacting with water, the surface of the particles is slowly passivated by the insoluble reaction product. If this layer covering the hydrolysable hydride is sufficiently thick then it is expected to slow, or worse, completely stop the reaction by blocking the access of additional water to the cores of the particles. However, by shaping and sizing the particles appropriately for a particular implementation, one can have the hydrolysable hydride fuel fully consumed before the hydrolysable hydride particles become passivated. Multiple parameters may be used to control the reaction rate with particle size and protective coating conformation. Without being limiting and in certain embodiments the shape of the hydrolysable hydride particles may be approximately spherical, somewhat elongated, wire-like, with or without multilevel surfaces. In certain embodiments the surface area to size ratio is made as large as possible so that as much of the hydrolysable hydride as possible is subject to reaction. For certain embodiments, the size of the particles may be selected to be from the following ranges along their primary axes: from 10 nanometers to 5 millimeters or from 100 microns to 3 mm or from 150 microns to 2 millimeters. Further in certain embodiments, without being limiting, the thickness of the protective layer coating the hydrolysable hydride within the gel (for example, polymer) which separates the reacting particle form the advancing water within the gel cartridge could be in the following ranges: from 1 nanometer to 10 microns, from 10 nanometers to 1 micrometer; and from 50 nm to 1 micrometer. When the neighboring hydrolysable hydride particles within the gel structure touch each other the preferred coating thickness refers to the thickness of the layer onto the outside particles. In addition, both the composition and the porosity of the protective coating thickness may be varied to control reactivity. The particles may have a monodisperse distribution in size and shape. Alternatively, particles may have multimodal distributions or even very broad distributions in particle size and shape.

(a.2.) Polymer Material

Adding water directly to certain types of hydrolysable hydrides, including but not being limited to metal hydrides and metal borohydrides, would be unsafe since their extreme reactivity with water would have a high probability of an explosion and fire. The introduction of the polymer material in the present application modulates the reaction and produces a steady and controlled flow of hydrogen gas, enabling safe handling.

As the water penetrates through the gradually swelling gel, it allows the particular hydrolysable hydride particles to react and get consumed while producing hydrogen gas. The precipitated reaction product, such as but not limited to metal hydroxide and metal metaborate is kept in place within the gel structure practically as particles replacing the initial hydrolysable hydride particles. Therefore, the polymer gel prevents the particles from settling as a top insoluble and impenetrable layer which would prevent further water access towards the unreacted hydrolysable hydride particles. The swelling of the polymer gel matrix composite encourages access of additional water molecules to the next particles into the depth of the cartridge. For comparison, in liquid sodium borohydride systems, the sodium precipitated sodium metaborate reaction product accumulates and prevents further access of the solution to the reaction place with the effect of slowing down the hydrogen flow. Thus the hydrolysable hydride gel material is a water access control material, which controls access to the plurality of hydrolysable hydride particles.

A particular formulation requirement for the polymer materials is the need for no reactivity in the presence of the selected hydrolysable hydride. Therefore polymer materials incorporating highly reactive proton groups such as alcohol (—OH) or acids (—COOH or —SO3H) are excluded as they react strongly with hydrolysable hydrides such as but not limited to metal hydrides and metal borohydrides in the same way as water.

The approach of the present application to control the hydrolysis rate uses, in one embodiment, a formulation including amphiphilic (hydrophilic-hydrophobic) copolymers. The higher the use of hydrophobic material content, the more limiting is water access to the hydrolysable hydride particles. Therefore, the hydrophobic material content is used to regulate the flow of generated hydrogen. Performance for a particular implementation is fine-tuned to achieve optimal stability and output by tuning the hydrophilic and hydrophobic polymer network chains. In other words, the use of the hydrophobic hydrophilic materials allow for water to interact with the hydrolysable hydrate particles in a controlled (e.g., time controlled) manner, which permits the hydrogen reaction to continue for an extended time. The hydrophilic component is capable in certain embodiments of being selected from, but not limited to, a group of water miscible materials such as polyethers, polyethyleneoxide, polyvinylpyrrolidone, some polyurethanes and the like. The hydrophobic component is capable but not limited to being selected from a group of materials incorporating high hydrocarbon content which is immiscible with water. Suitable hydrophobic components include polyethylene, polyalkyl acrylates and methacrylates, aromatic substituted polymers such as styrene and substituted styrene groups and the like.

Polymer Types and Methods

Without being limiting thereto, several forms in which the polymer material can be provided is described below: First the gel material can be an amphiphilic copolymer, i.e. a polymer consisting of two or more different repeating structural units wherein the units are a mixture of hydrophilic and hydrophobic materials. In this case such a premade copolymer is added as a solution into a suitable solvent. Solvent evaporation will provide solid gel material. Many amphiphilic copolymers are commercially available. Based on the above disclosed design rules, most of the solid state materials surfactants and dispersants used in colloidal chemistry can also be used for gel fabrication because they contain various contents of hydrophilic/hydrophobic components. Suitable amphiphilic polymers such as polyethylene-block-poly(ethylene glycol) and poly(ethylene glycol)-block-poly (ε-caprolactone) methyl ether are commercially available. The type and the length of the hydrophilic and hydrophobic polymer components can be tuned to control the reactivity of the particularly selected hydrolysable hydride both by changing the hydrophilic/hydrophobic content and by affecting the particle-polymer interface, therefore controlling the swelling behavior of the gel in water.

Figure 8:
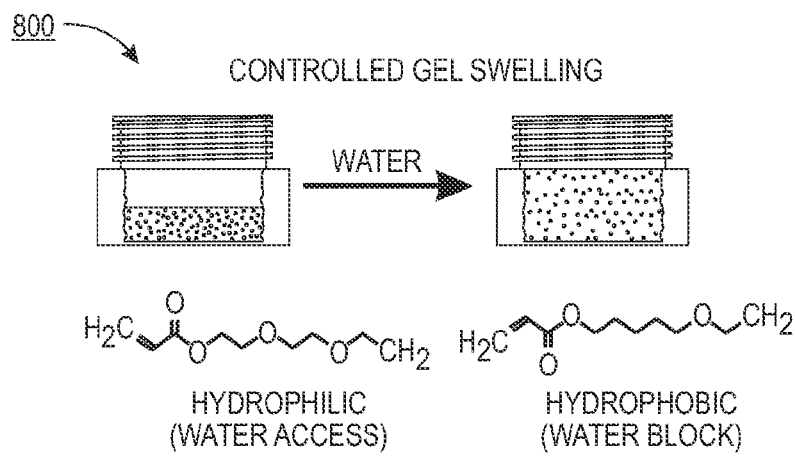
FIG. 8 illustrates controlled gel swelling in accordance with the present concepts.

Second, the polymer material can be produced by mixing different polymer precursors (hydrophilic and hydrophobic), i.e. monomers which after preparation of the composite material with hydrolysable hydride gel are cured to polymerize. The polymerization is enabled by the addition of initiator(s) which can be for example a thermal initiator such as benzoyl peroxide and AIBN or by a photo initiator such as the Irgacure series available form BASF/CIBA, among others. The monomers can be selected from a wide range of materials. The polymerization of a mixture of monomers shown by illustration 800 in FIG. 8 will for example produce a suitable amphiphilic copolymer. The monomers can be monofunctional or multifunctional (containing more than one polymerizable groups). The monomers can be purely hydrophobic or hydrophilic in nature such as those illustrated in FIG. 8 or they can be amphiphilic (containing both hydrophilic/hydrophobic groups). The end result is an amphiphilic solid polymer composite material.

Suitable hydrophilic monomers include but are not limited to: polyethylene glycol diacrylate, N,N-dimethylacrylamide, 1-vinyl-2-pyrrolidone, highly ethoxylated bisphenol A diacrylates. Suitable hydrophobic monomers include but are not limited to: polyurethane, hydrocarbon, polyether and polyster multifunctional acrylates such as mono-, di-, tri-, tetra-penta- or hexa-acrylates. Many mono and multifunctional monomers are commercially available for example at Sartomer-Arkema Group.

In an embodiment, the polymer materials are selected in such a way that it will swell in water. There is a part of the polymer material that allows water into it ("dissolves this segment of the polymer") but there is also another segment which is insoluble. Overall, the system swells but it does not truly dissolve. This is a distinctive feature which is useful to control the hydrogen flow generation. Particularly, if all of the polymer is dissolved, then all the insoluble hydrolysable hydride hydrolysis product will settle and block further water access to unreacted hydrolysable hydride particles, and will slow down the reaction, which is not a desired result.

Gel Preparation

Without being limiting thereto, an approach of the gel preparation includes placing a plurality of hydrolysable hydride particles into a preformed mold. Infusing the mold with the polymer material such as a polymer precursor or liquid (having the necessary amphiphilic formulation, to provide a tuning of the hydrolysable hydride gel). Then mixing the hydrolysable hydride particles and the polymer material is under taken, which in some embodiments fill inter-particle gaps. Mixing is performed with common stirring equipment such as an overhead stirrer, as well as other stirring equipment that would be known to one of ordinary skill in the art. Thereafter a curing operation is undertaken to cure the polymer material(s) to produce a solid polymer composite material. The curing maybe performed by a number of known devices and methods including heating or by exposure to a curing light. In the above description, at least the infusing and placing steps maybe reversed.

In another approach, hydrolysable hydride particles are placed and maintained at specific locations within the mold (as would be known by one skilled in the art) followed by the infusion of the liquid polymer or polymer precursor (having the necessary amphiphilic formulation) to an amount sufficient to cover the particles. In this case mixing which would move the hydrolysable particles from their original placement in a mold is not undertaken. Also, liquid polymer or polymer precursor is infused into the mold in a controlled manner such that the position of at least some of the hydrophilic and hydrophobic components of the polymer are placed at predetermined locations to or from at least some of the hydrolysable hydride particles. This process provides additional tuning of the hydrolysable hydride gel (see FIG. 13). Curing provides the final solid state gel ready for use.

c) Hydrolyzer Unit and Cartridge

Figure 9:
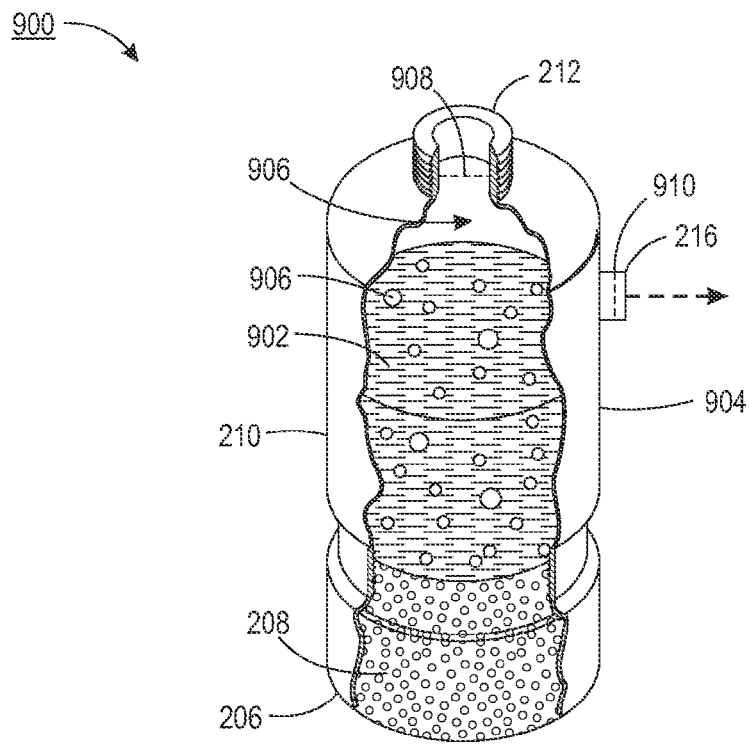
FIG. 9 illustrates a cutaway view of a hydrolyzer and hydrolysable hydride gel cartridge base during operation.

The hydrolyzer is where the hydrogen production takes place. Hydrolyzer unit 210 cartridge base 206 combination 900 illustrated in FIG. 9 represents a conceptual embodiment of a hydrolyzer unit. It is however to be understood a number of different designs can be used to achieve the desired results. The hydrolyzer unit 210 includes a simple, rugged and safe design to attach disposable cartridges (or be configured as a single hydrolyzer-cartridge combination) 206, add water, regulate and route gas flow to the hydrogen based energy generator, and manage the heat generated by the reaction. One design option when used with a fuel cell includes recycling the water vapor produced by the fuel cell by using it as a reactant fed into the hydrolyzer unit 210 as depicted in FIG. 3. This solution leads to increased energy densities.

The schematic structure hydrolyser unit with snap-fit hydrolyzer gel cartridge combination 900 of FIG. 9 includes a more detailed view of the cartridge base containing hydrolysable hydride gel 208 of FIG. 2.

With continuing reference to FIG. 9, it is noted the second entry port of FIG. 2 is not shown due to the cutaway of the image. As shown in FIG. 9, the hydrolysable hydride gel 208 is located within the previously discussed cartridge base 206. In FIG. 9, water 902 is shown to be located or provided on top of the hydrolysable hydride gel 206 in a water portion 904 of the hydrolyzer 210, although it is to be appreciated this is just one option and in alternative embodiments, the water is provided at other locations including the bottom and sides of the hydrolyzer, and may also be provided through multiple access points. It is also to be appreciated this water region 904 is a distinct concept from the water reservoir of the system controlling the water supply to the hydrolyzer 210.

As reactions occur due to the interaction between the water and hydrolysable hydride gel, hydrogen gas (shown as bubbles) 906 moves toward the upper portion of the hydrolyzer 210 and is then allowed to move out of the output port 216 as has been previously discussed. It is to be appreciated the illustration of FIG. 9 also depicts optional aspects related to the input ports 212 (not shown 214) and output port 216. For example, a check valve arrangement 910 may be included with the input ports that insures hydrogen gas that is percolating to the upper portions of the hydrolyzer 210 is stopped from exiting the input ports 212 (214). For example, this may be a one-way check valve 908 or other backflow restrictor. As with the exit port 216, a valve 910 may operate to close and open, depending upon the hydrogen gas being generated and the needs of the hydrogen energy generator. The valve may be an on-off valve, or a valve that opens a certain percentage to limit the amount of hydrogen gas being allowed to exit. These valves, in certain embodiments, are manually controlled or alternatively are controlled by an automated controller(s) such as controllers 224, 226, as would be understood as being well known in the art.

As mentioned, the hydrolyzer and hydrolysable hydride gel cartridge base combination 900 shown in FIG. 9 is simply one configuration of a system to generate controlled hydrogen as discussed herein. It is understood other designs may also be employed.

Figure 10:
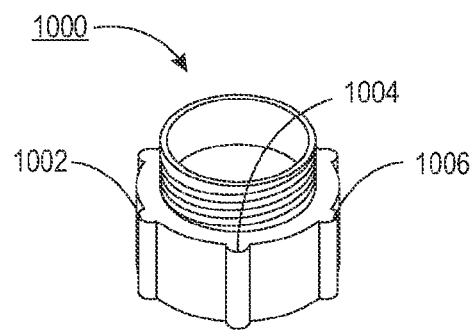
FIG. 10 depicts an alternative view of the hydrolysable hydride gel cartridge base configuration.

In a particular instance, with attention to FIG. 10, illustrated cartridge base 1000 is designed to include channels 1002, 1004, 1006 in the cartridge base walls. These channels provide a space between a formed hydrolysable hydride gel configuration which allows water to access the hydrolysable hydride gel along the sides of the formed gel, as opposed to the embodiment shown in FIG. 9 where water is contacting the hydrolysable hydride gel from substantially solely on its upper surface, as the gel is fit tight to the sidewalls of the cartridge base.

On the other hand in the cartridge base 1000 of FIG. 10, as water is introduced into a connected hydrolyzer (e.g., 210), the water will enter the channels 1002, 1004, 1006 (on the interior of the cartridge base 1000). The channels in certain embodiments are sized in consideration of the amount of water to be added, such that the water will initially fill up the channels at least partially with the water. This construction and operation thereby provides access to the sides and bottom of the gel material (e.g., 208.

Figure 11:
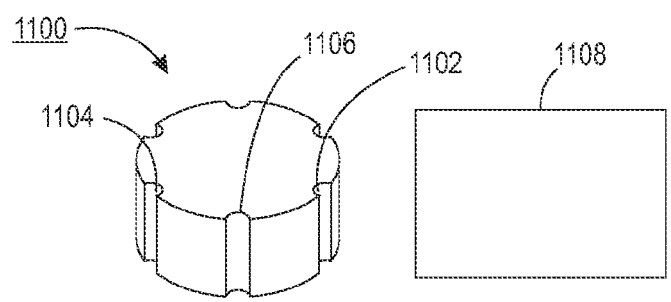
FIG. 11 depicts an embodiment of the hydrolysable hydride gel formed by use of a mold.

An alternative concept in this regard, as shown by hydrolysable hydride gel material 1100 of FIG. 11, is to form the gel material by the use of a mold 1108 which results in the gel itself having channels 1102, 1104, 1106. In this embodiment, again, the water will have access to multiple sides or areas of the gel formation rather than simply the top surface. When water is introduced into the hydrolyzer, cartridge base combination (with the cartridge base containing the molded gel 1100 and the base having flat-sided walls, such as base 202). It is to be appreciated in certain embodiments the gel mold 1100 may also be placed in the interior of cartridge base 1000. Still further, while the foregoing shows one particular molded gel 1100, alternative mold forms can also be implemented.

Figure 12:
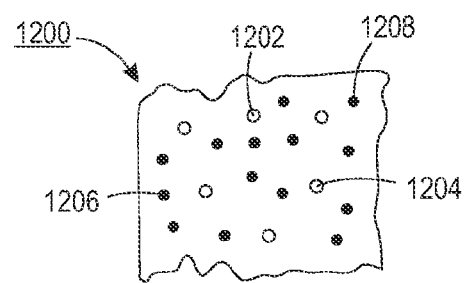
FIG. 12 depicts a portion of the hydrolysable hydride gel, including pores and/or channels.

Turning to FIG. 12, illustrated is a portion of a gel formation 1200 which is constructed to include pores 102, 1204 (all pores, which are shown here as solid black dots, are not numbered for ease of viewing and understanding). Controlling the pore size, depth and placement provides design flexibility in controlling the rate of the hydrolysis reaction. In one embodiment, a pore 1202 may in fact be designed as a channel which allows (depending on size) water a faster access to the hydrolysable hydride particles (e.g., 1206, 1208) (all hydrolysable hydride particles are not numbered for viewing and discussion clarity). Thus, it is understood that depending on the size of the pores or channels that are created, this allows for controlling a speed at which water accesses the hydrolysable hydride particles, where smaller channels or pores will slow the process down, and larger channels or pores would increase the process speed.

Figure 13:
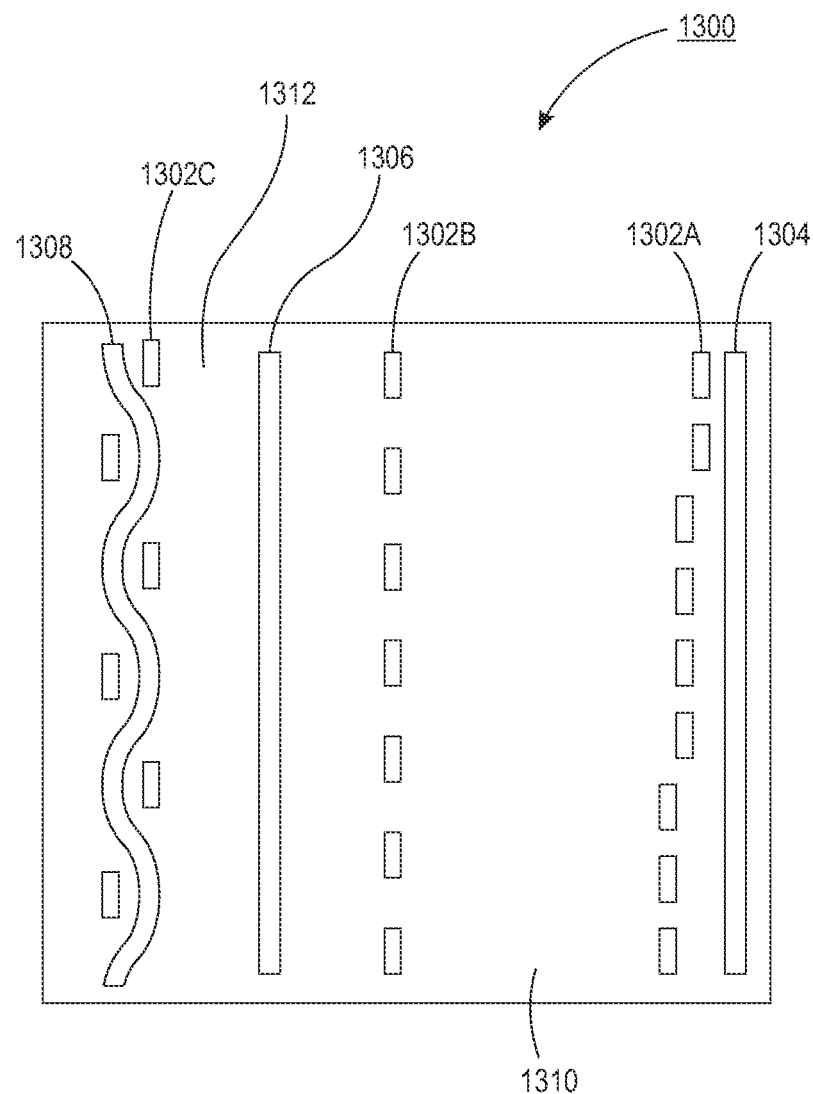
FIG. 13 illustrates a portion of the hydrolysable hydride gel formed with channels by use of a mold.

Turning to FIG. 13, illustrated is a portion of a hydrolysable hydride gel 1300 which has been formed by use of a molding process. For understanding, elements 1302a, 1302b, 1302c are arrayed hydrolysable hydride particles which may be coated or non-coated (for coatings see discussion in connection with FIG. 14, which follows). In either case, these particles are placed at particular locations within a mold, thereafter the mold includes structure that create voids or channels 1304, 1306, 1308. These channels are filled with very hydrophilic material as opposed to non-channel areas such as 1310 and 1312 which are composed of more hydrophobic material.

This type of construction allows for the tuning or timing of interactions between the water and the hydrolysable hydride particles. In one example, channel 1304 is noted to be much closer to particles 1302a than a channel 1306 is to its closest particles 1302b. In this understanding, the reaction of particles closer to channel 1304 would occur prior to that then the particles 1302b near channel 1306. Still further, channel 1308 is shown as a serpentine arrangement simply to emphasize that alternative structure of the channels are possible to finely tune the time when reactions will occur between water and hydrolysable hydride materials.

It is also to be understood that the hydrolysis reaction being undertaken will generate significant heat. As previously noted, the water, when used in a fuel cell operation, may be recycled and reused for the additional reactions. For example, water is recycled for continuing operation for continued conversion of the hydrogen. This may be used for the same cartridge that it was originally used or, alternatively, once the original cartridge has been expended, when a new cartridge is then moved into place, this water is used for that reaction, resulting in a continuous recycling operation.

In an alternative use of the water that comes from the fuel cell, this water is supplied back to the hydrolyzer for cooling purposes. As illustrated in FIG. 1B the water may be provided to channels on the exterior of the hydrolyzer, to provide a water cooling jacket or heat exchanger to diminish the heat generated by the hydrogen producing reactions.

Water Vapor Separator Membrane

The fully integrated system incorporates a water separator membrane (See FIGS. 1B and 3) to prevent the water vapors which may be produced by the heat generated by the hydrogen production reactions from being entrained into the hydrogen storage unit. Excessive humidity in the hydrogen feed may diminish the fuel cell performance. Suitable vapor phase dehydration membranes consist of hollow fiber membranes which allow for selective separation of water vapors from gas stream. PEEK-SEP™ membranes are commercially available from PoroGen (Woburn, Mass.).

It is also noted that only small amounts of water are used at a time. Therefore, if, for example, one liter of water is used in the original operations, that liter will be reformed out of the hydrogen fuel cell. This liter then returned to the hydrolyzer either for further hydrolyzer operations or cooling operations, would be substantially the same liter of water. Therefore over 90% and more particularly over 95% of the originally used water may be resupplied to the hydrolyzer. Then for either situation, there is a recirculation of the water providing a substantially continuous supply as needed.

Example 1

Figure 14:
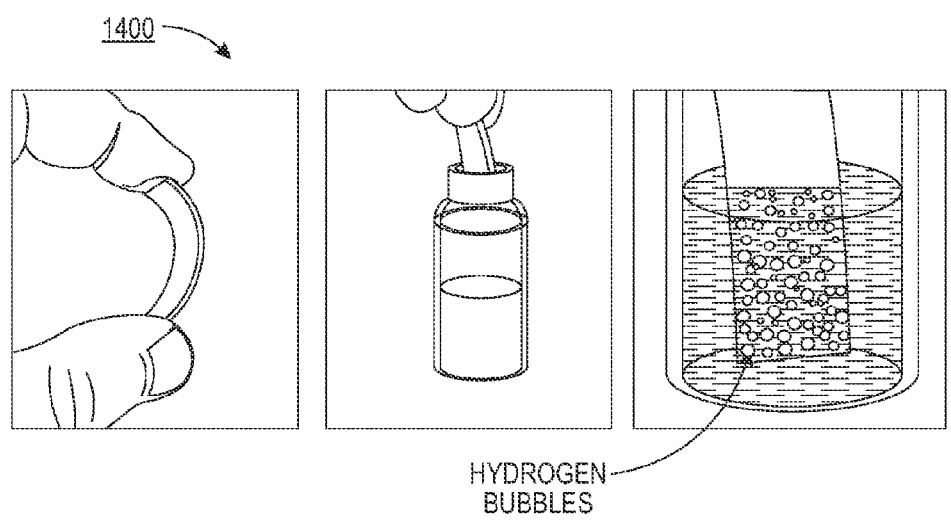
FIG. 14 depicts a tablet formed with hydrolysable hydride materials.

A polymer composite material in the shape of a tablet was prepared as follows: 4 g of SR 9038 liquid monomer (highly ethoxylated bisphenol A diacrylate from Sartomer) was mixed with 1 g of calcium hydride powder and with 0.2 g photoinitiator (PL-WHT) at room temperature for 5 minutes. A coating was fabricated by using standard doctor blade procedure. The coated film was cured by exposure to UV light for 3 minutes. Turning to FIG. 14, illustration 1400 depicts a polymer/calcium hydride composite material in the shape of a tablet placed in water to demonstrate the slow release of hydrogen. As shown in the FIG. 14, the material is safe to handle and produces a slow flow of hydrogen when placed in water.

Example 2

0.5 g of calcium hydride powder was placed in a glass vial. In a separate container a curable prepolymer mixture was prepared by mixing and sonicating 10 g of an acrylate monomer (SR 9003B from Sartomer) and 200 mg of benzoyl peroxide (thermal radical polymerization initiator from Sigma Aldrich). 0.70 g of this liquid mixture was added to the first vial such as to completely cover after infusion the calcium hydride particles. The vial is placed under vacuum heated at 80 degrees C. and allowed to cure. The final product is a solid polymer/calcium hydride gel composite pellet. A small portion of this material is cut away and placed in water. The gel produced hydrogen bubbles in a slower controlled rate for over 15 seconds. For comparison, placing the same amount of pure calcium hydride powder in water results in instant evolution of the whole amount of hydrogen (1-2 seconds for hydrolysis completion).

The described systems and methods provide power solutions for a number of situations, such as where being lightweight is useful, for example UAVs (drone) power. Commercial drones are being developed for applications such as parcel delivery, transportation of emergency supplies, agricultural sensors to monitor soil quality, irrigation efficiency or plant growth, traffic control, or similar uses. Other applications include power for back-up power generators, soldier power, expeditionary power and power for robotic systems. In particular a fully integrated system will have unmatched performance benefits for drone flight when compared with Li-ion power supply used today. For drone delivery applications, the use of the proposed hydrolysable hydride gel system instead of Li-ion batteries enables a 4× increase of the drone payload or about 2× increase in the flight range, achieved through a reduction in drone weight that allows for energy savings.

Aspects of the described system include: (i) high specific (mass) energy density an volumetric density advantage over Li-ion batteries, aqueous or thermal hydrolysable hydrides; (ii) high volumetric density over compressed hydrogen; (iii) fire and explosion safe when compared with gasoline or hydrogen; (iv) and ideal power source for applications where lightweight is critical; (v) low acoustic signatures.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A hydrogen production system comprising:
   a hydrolysable hydride gel material including a plurality of at least one type of hydrolysable hydride particle dispersed in a polymer material, wherein the polymer material comprises chemically bonded hydrophilic and hydrophobic monomers;
   a hydrolysable hydride gel cartridge holding the hydrolysable gel material; and
   a hydrolyzer having an input port and an output port, wherein the input port is configured to receive at least one of water and water vapor and the output port is configured to output hydrogen gas.

2. The system according to claim 1, wherein the hydrolysable hydride gel material is a tuned material, having at least some of the plurality of hydrolysable hydride particles positioned at predetermined locations with respect to the hydrophobic and hydrophilic monomers to control timing of reactions of the at least some of the plurality of hydrolysable hydride particles.

3. The system according to claim 1 wherein the plurality of at least one type of hydrolysable hydride gel material is at least one of a water and water vapor controlled swelling composite.

4. The system according to claim 1 wherein the hydrolysable hydride particles have particle sizes in a range from 10 nanometers to 5 millimeters.

5. The system according to claim 1 wherein the hydrolysable hydride gel material is a water access control material, which controls access to the plurality of hydrolysable hydride particles.

6. The system according to claim 1 wherein the hydrolysable hydride gel cartridge and the hydrolyzer are integrated as a single component.

7. The system according to claim 1 wherein the hydrolysable hydride gel cartridge is a separate component detachable from the hydrolyzer.

8. The system according to claim 1 wherein the hydrolysable hydride gel cartridge is formed to provide multiple points of water and/or water vapor entry into an interior of the hydrolysable hydride gel cartridge, wherein the water and/or water vapor has access to the hydrolysable hydride gel material at multiple locations.

9. The system according to claim 1 wherein the hydrolysable hydride gel material is a mold-formed material, the form of the mold resulting in the gel material being formed in a shape corresponding to the mold.

10. An integrated power generating system comprising:
    a hydrogen production system including:
    a hydrolysable hydride gel material including a plurality of at least one type of hydrolysable hydride particle dispersed in a polymer material, wherein the polymer material comprises chemically bonded hydrophilic and hydrophobic monomers;
    a hydrolysable hydride gel cartridge holding the hydrolysable hydride gel material; and
    a hydrolyzer having an input port and an output port, wherein the input port is configured to receive at least one of water and water vapor and the output port is configured to output hydrogen gas;
    a fuel cell configured to receive the hydrogen gas; and
    a recycling system configured to recycle at least one of water and water vapor produced by operation of the fuel cell back to the input port of the hydrolyzer for use in hydrogen production.

11. The integrated power generating system of claim 10 further including a water vapor separator positioned to stop water vapor from being provided to the fuel cell.

12. The integrated power generating system of claim 10 further including a cooling system configured to receive at least one of water and water vapor generated by operation of the fuel cell and to move the at least one of water and water vapor into operational contact with the hydrolyzer to cool the hydrolyzer.

13. The integrated power generating system of claim 12, wherein the cooling system further includes a heat exchanger in physical contact with the hydrolyzer.

14. A hydrogen production system comprising:
    a hydrolysable hydride gel material including a plurality of at least one type of hydrolysable hydride particle dispersed in a polymer material, wherein the polymer material comprises an amphiphilic copolymer;
    a hydrolysable hydride gel cartridge holding the hydrolysable gel material; and
    a hydrolyzer having an input port and an output port, wherein the input port is configured to receive at least one of water and water vapor and the output port is configured to output hydrogen gas.

15. The system according to claim 14 wherein the amphiphilic copolymer is selected from the group consisting of polyethylene-block-poly(ethylene glycol) and poly(ethylene glycol)-block-poly(ε-caprolactone) methyl ether.

16. The system according to claim 1 wherein the hydrophilic monomer is selected from the group consisting of polyethylene glycol diacrylate, N,N-dimethylacrylamide, 1-vinyl-2-pyrrolidone, and ethoxylated bisphenol A diacrylate.

17. The system according to claim 1 wherein the hydrophobic monomer is selected from the group consisting of polyurethane, polyether, and polyester multifunctional acrylates.

18. The system according to claim 1, wherein the hydrophilic monomer is selected from the group consisting of ethers, ethyleneoxide, vinylpyrrolidone, and urethanes; and wherein the hydrophobic monomer is selected from the group consisting of ethylene, alkyl acrylates and methacrylates, and aromatic substituted monomers.

* * * * *